US010089389B1

(12) United States Patent
Van Rotterdam et al.

(10) Patent No.: US 10,089,389 B1
(45) Date of Patent: Oct. 2, 2018

(54) TRANSLATION OF UNSTRUCTURED TEXT INTO SEMANTIC MODELS

(71) Applicant: EMC Corporation, Hopkinton, MA (US)

(72) Inventors: Jeroen M. Van Rotterdam, Berkeley, CA (US); Dmitry Volchegursky, Livermore, CA (US); Chao Chen, Shanghai (CN); Ameya Devendra Bapat, Bangalore (IN); Shanmugasundaram Ks, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 367 days.

(21) Appl. No.: 14/871,123

(22) Filed: Sep. 30, 2015

(51) Int. Cl.

| | |
|---|---|
| ***G06F 17/30*** | (2006.01) |
| ***G06F 3/0484*** | (2013.01) |
| ***G06F 3/0482*** | (2013.01) |
| *G06F 17/27* | (2006.01) |

(52) U.S. Cl.
CPC ...... *G06F 17/30696* (2013.01); *G06F 3/0482* (2013.01); *G06F 3/04842* (2013.01); *G06F 17/30684* (2013.01); *G06F 17/2785* (2013.01)

(58) Field of Classification Search
None
See application file for complete search history.

(56) References Cited

U.S. PATENT DOCUMENTS

| | | | | |
|---|---|---|---|---|
| 2004/0083199 | A1* | 4/2004 | Govindugari | G06F 17/30303 |
| 2004/0254904 | A1* | 12/2004 | Nelken | G06F 17/2705 706/50 |
| 2011/0258181 | A1* | 10/2011 | Brdiczka | G06F 17/278 707/723 |
| 2013/0282645 | A1* | 10/2013 | Culbertson | G06N 7/005 706/52 |
| 2015/0205785 | A1* | 7/2015 | Beckwith | G06F 17/277 707/738 |
| 2016/0034512 | A1* | 2/2016 | Singhal | G06F 17/30705 707/737 |
| 2017/0052938 | A1* | 2/2017 | Allen | G06F 17/243 |

OTHER PUBLICATIONS

Rahutomo, F. et al., "Semantic Cosine Similarity", Graduate School of Science and Technology, Kumamoto University, Oct. 2012. (3 pages).
Guthrie, D. et al., "A Closer Look at Skip-gram Modeling", NLP Research Group. Department of Computer Science, University of Sheffield, 2006. (4 pages).

* cited by examiner

*Primary Examiner* — Jau-Shya Meng
(74) *Attorney, Agent, or Firm* — Chamberlain Hrdlicka

(57) ABSTRACT

Semantic model usage includes receiving, via a graphical user interface, input of unstructured text from a user. While receiving the input, the input is compared to semantic models in a semantic library, and from the semantic model, a semantic model satisfying a threshold is selected. A suggestion is generated from the semantic model, and presented, in the graphical user interface, to the user. An acceptance of the suggestion may be received. The input is augmented with the suggestion and stored.

17 Claims, 5 Drawing Sheets

TRANSLATION OF UNSTRUCTURED TEXT INTO SEMANTIC MODELS

BACKGROUND

Automated content extraction is the process of a computer receiving a document and obtaining various data items from the document. With structured documents, the content extraction is straightforward. In particular, the computer may parse the document to identify standard codes (e.g., field codes) that are associated with the content, and extract the content from the document based on the standard codes. With unstructured content in a document, the extraction may involve analyzing the content directly and using heuristics to extract the content based on the characteristics of the content.

DETAILED DESCRIPTION

Figure 1:
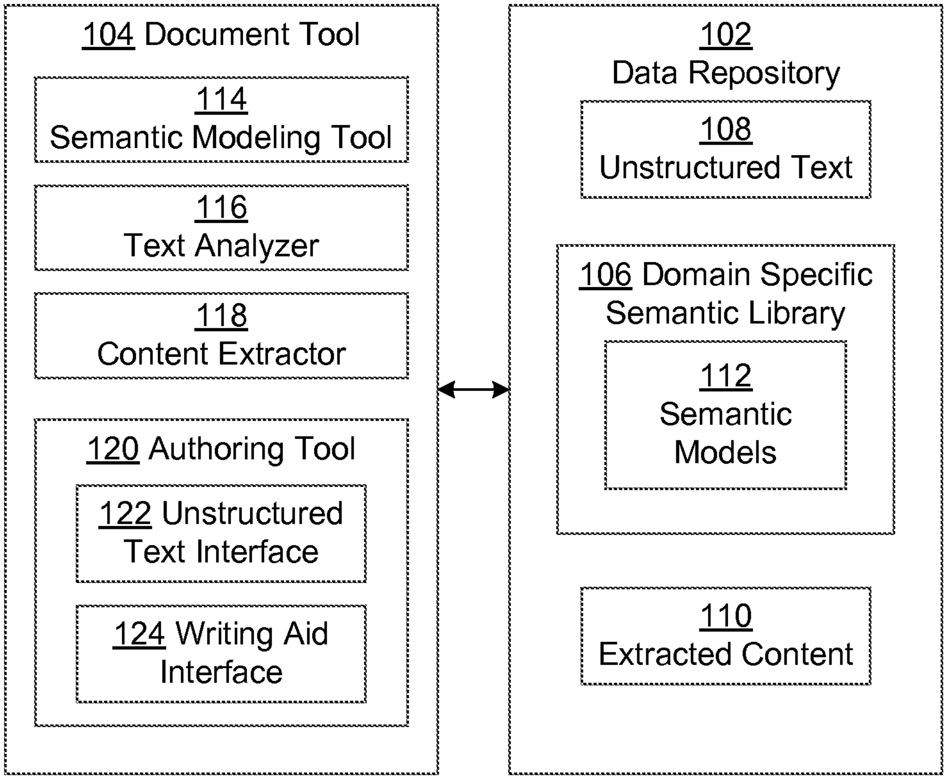
FIG. 1 shows a schematic diagram of a system in accordance with one or more embodiments of the technology.

Specific embodiments of the technology will now be described in detail with reference to the accompanying figures. Like elements in the various figures are denoted by like reference numerals for consistency.

In the following detailed description of embodiments of the technology, numerous specific details are set forth in order to provide a more thorough understanding of the technology. However, it will be apparent to one of ordinary skill in the art that the technology may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the technology are directed to management of unstructured text. In particular, one or more embodiments may build a semantic model library as a user is providing various documents having unstructured text. When a user starts submitting new unstructured text, the semantic model library is accessed to identify one or more semantic models that may match the unstructured text. The user is then prompted with one or more suggestions of the semantic model(s). If the user accepts the suggestion, the user may complete submitting input using the semantic model and create a document with the input. The semantic model adds structure to the unstructured text. Using the structure, content may be extracted from the document.

FIG. 1 shows a schematic diagram of a system in accordance with one or more embodiments of the technology. As shown in FIG. 1, the system includes a data repository (102) that is operably connected to a document tool (104). Both of these components are described below.

In one or more embodiments of the technology, the data repository (102) is any type of storage unit and/or device (e.g., a file system, database, collection of tables, or any other storage mechanism) for storing data. Further, the data repository (102) may include multiple different storage units and/or devices. The multiple different storage units and/or devices may or may not be of the same type or located at the same physical site.

The data repository (102) includes functionality to store a domain specific semantic library (106), unstructured text (108), and extracted content (110). A domain specific semantic library (106) is a repository of semantic models (112) for a particular domain. A domain is a particular discipline in which one or more users may operate. For example, the domain may be an academic field, a profession, a particular technical field, or another field. By way of a more concrete set of examples, a domain may be medical, orthopedics, patent prosecution, civil engineering, concrete testing, or another realm of activity. A domain specific semantic library (106) is a library in which the semantic models (112) are restricted to the domain. In other words, the domain limits the semantic models (112) that are in the library.

Semantic models (112) are models of input in which semantic information is included. Semantic information captures meaning behind the sentence. In one or more embodiments of the technology, semantic models (112) may be captured as a triple having an subject object, a relation, and a target object. The subject object is a parameter for defining the subject of the unstructured text input. The target object is a parameter for defining a direct object in the sentence. The relation specifies how the subject object relates to the target object. A semantic model may define, for example, the data type of the parameters. In other words, a semantic model may include the data type of the target object, and the data type of the direct object. As part of the data type, semantic information may be captured. For example, whereas the general data type may specify String, the semantic information included with the general data type may be object name, proper name, or other characteristic of String. By way of another example, if the general data type is a number, the semantic information may be the range of numbers permitted, such as 50-120 in the case of temperature. The relations of the semantic model may be defined with respect to particular verbs. In other words, each semantic model may include a verb that is expected for the semantic model. For example, the verb may be "has/have," "be," "include," or another verb. The semantic model may include the base tense of the verb, and the remaining tenses may be included as part of the same semantic model. In some domains, additional parameters may be included. For example, in the medical domain, each semantic model may include a time parameter. The time parameter is a position in the semantic model that captures time. Thus, in such embodiments, the semantic model may be a quadruple, having two objects, a relation that relates the two objects to each other, and a time parameter. The two objects, the relation, and the time parameter may each be referred to as a model parameter.

In one or more embodiments of the technology, instances of the semantic model (not shown) specify specific values for the model parameters and the specific tense of the verb. For example, whereas a semantic model may be <Name>, have, temperature, <temperature value in range of 50-120>, time, the instance of the semantic model may be "Smith had a temperature of 102 degrees at 3:00 PM".

Although a domain specific semantic library is disclosed herein, a general purpose library may be used in some embodiments of the technology. For example, the general purpose library may span multiple domains. In other words, the general purpose semantic library does not restrict semantic models to a particular domain in accordance with one or more embodiments of the technology.

Continuing with FIG. 1, unstructured text (108) corresponds to text that does not satisfy a semantic model. In other words, unstructured text (108) does not have a semantically known structure, but may comply with a syntactic grammar of the language used to create the text. For example, unstructured text may be text in which a semantic model is not yet generated, and has not been processed. Examples of unstructured text includes text written in a word processing application, a note application, or other freeform application in which the user has not been prompted and has not selected any model for generating the text.

In one or more embodiments of the technology, extracted content (110) is content extracted from one or more documents. In one or more embodiments, the extracted content (110) is not in a document submitted by a user, but rather separate content that is obtained from any document submitted by or created by a user. For example, extracted content may include content extracted from unstructured text (108) or from other information. In one or more embodiments of the technology, extracted content (110) expressly relates parameter values to corresponding parameters. Further, extracted content may be stored in virtually any format. For example, the extracted content may be stored as database records, whereby each record relates an attribute or parameter to the corresponding attribute value of the attribute.

Continuing with FIG. 1, the document tool (104) may correspond to hardware, software, firmware, or any combination thereof that includes functionality to assist a user in submitting content. Further, the document tool (104) may assist a user in extracting content. Various steps performed by one or more components of the document tool are described below with reference to FIGS. 2 and 3. In one or more embodiments of the technology, the document tool (104) includes a semantic modeling tool (114), a text analyzer (116), a content extractor (118), and an authoring tool (120).

Figure 2:
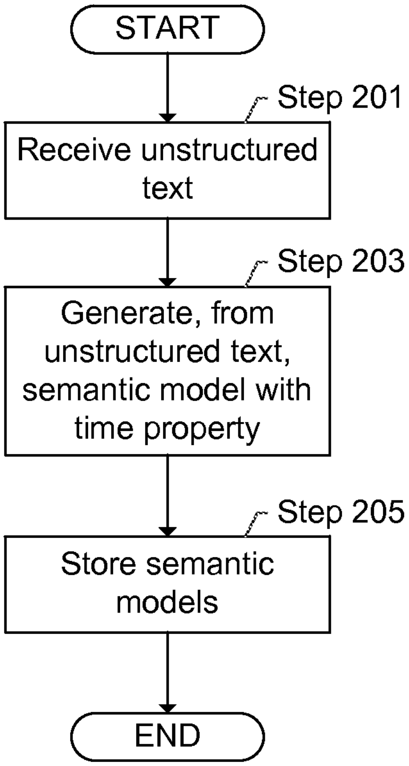
FIGS. 2 and 3 show flowcharts in accordance with one or more embodiments of the technology.

The semantic modeling tool (114) includes functionality to generate semantic models from unstructured text (108). In other words, the semantic modeling tool (114) includes functionality to analyze the unstructured text and generate semantic models (112) from the unstructured text. FIG. 2 shows an example flowchart that may be performed by the semantic modeling tool in accordance with one or more embodiments of the technology.

Continuing with FIG. 1, in one or more embodiments of the technology, the text analyzer (116) includes functionality to analyze input from a user and identify a semantic model from the domain specific semantic library (106) that is particular to the input. For example, the text analyzer (116) may include functionality to compare, while the user is submitting input of unstructured text, the input to semantic models in the domain specific semantic library (106) to obtain one or more suggestions. A suggestion is an instance of a semantic model that may be at least partially populated with the user's input. In one or more embodiments of the technology, the suggestion includes space for values of at least some of the parameters in the semantic model. In other words, whereas a semantic model may include identification of the data types for each parameter, the suggestion may include the value of the parameter for any parameters having values submitted by the user. The text analyzer (116) may include functionality to perform one or more Step of FIG. 3.

In one or more embodiments of the technology, the content extractor (118) includes functionality to extract content from unstructured text that complies with a semantic model. In other words, the content extractor (118) is configured to identify the semantic model matching the unstructured content and extract content using the semantic model.

In one or more embodiments of the technology, the authoring tool (116) is an interface for assisting a user to submit unstructured and structured text to the computing system. The authoring tool (120) may have an unstructured text interface (122) and a writing aid interface (124).

The unstructured text interface (122) is an interface for submitting unstructured text in accordance with one or more embodiments of the technology. In other words, the unstructured text interface (122) provides a freeform interface for submitting text. An example of an unstructured text interface is an interface of a word processing application or a note application, that does not provide suggestions to the user. The unstructured text interface (122) may assist the user in submitting unstructured text, such as by including selectable buttons or other menu options for formatting text, selectable buttons or other menu options for creating an outline, or other widgets.

The writing aid interface (124) is an interface that is configured to assist the user to submit text complying with semantic models. In other words, the writing aid interface (124) may be similar to the unstructured text interface, but include functionality to provide suggestions to the user to structure the unstructured text. In one or more embodiments of the technology, the writing aid interface (124) may include the user interface widgets of the unstructured text interface as well as user interface widgets to present one or more suggestions and receive a selection of a suggestion. In one or more embodiments of the technology, the user interface widget to present a suggestion and receive a selection may be a popup list box or combo box. Other user interface widgets may be used without departing from the scope of the technology. In one or more embodiments, the writing aid interface (124) may further include functionality to augment the input from the user of unstructured text and create augmented input. The augmented input may appear as unstructured text, but may comply with a semantic model. In other words, the order of words and the words used may comply with a semantic model even though, in the domain, the input appears as unstructured text. Thus, one or more embodiments may not change the natural language of the input, but rather change the style of the input in order to conform with a semantic model.

Although FIG. 1 shows the unstructured text interface and the writing aid interface as two separate interfaces, the unstructured text interface and the writing aid interface may be the same interface. For example, the writing aid interface may be a mode of the unstructured text interface in which the writing aid interface widgets are enabled in the unstructured text interface.

While FIG. 1 shows a configuration of components, other configurations may be used without departing from the scope of the technology. For example, various components may be combined to create a single component. As another example, the functionality performed by a single component may be performed by two or more components.

Figure 3:
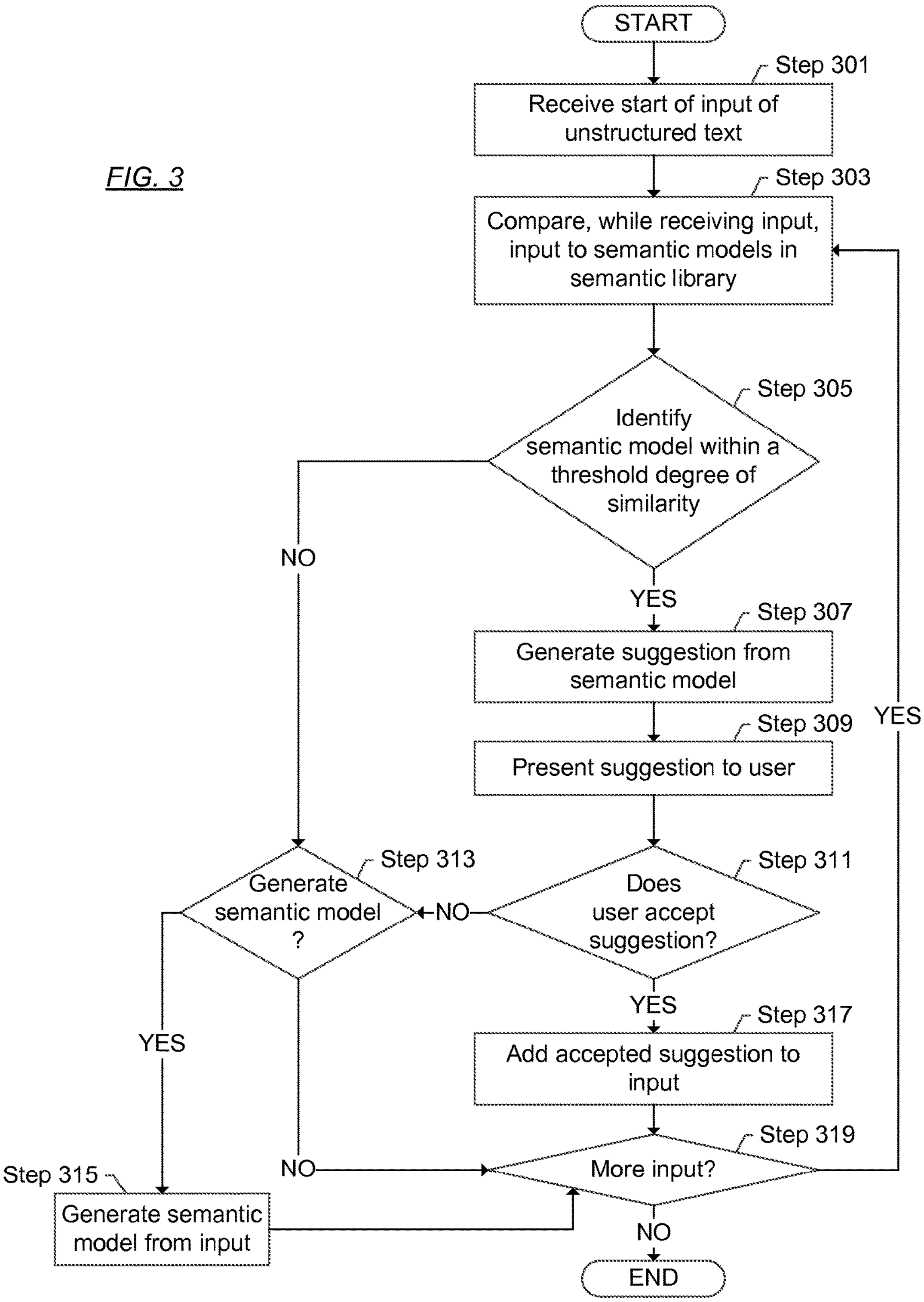

FIGS. 2 and 3 show flowcharts in accordance with one or more embodiments of the technology. While the various steps in these flowcharts are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the technology. By way of an example, determination steps may not require a processor to process an instruction unless an interrupt is received to signify that condition exists in accordance with one or more embodiments of the technology. As another example, determination steps may be performed by performing a test, such as checking a data value to test whether the value is consistent with the tested condition in accordance with one or more embodiments of the technology.

FIG. 2 shows a flowchart for generating semantic models in accordance with one or more embodiments of the technology. In Step 201, unstructured text is received in accordance with one or more embodiments of the technology. In one or more embodiments of the technology, unstructured text may be received from storage, such as from a prior existing repository of unstructured text. Unstructured text may also be received from a user submitting the unstructured text in the unstructured text interface. If received from storage, a user may identify to the semantic modeling tool, the location of the unstructured text. In response, the semantic modeling tool may access the location via an operating system of the computing device. The unstructured text may be from a single user or from multiple users. If the unstructured text is from a single user, then the resulting semantic models may be specific to the particular user. If the unstructured text is from multiple users, then the resulting semantic models may span the domain of the multiple users.

In Step 203, from the unstructured text, one or more semantic models having a time property are generated in accordance with one or more embodiments of the technology. Generating the semantic models may be performed using machine learning algorithms. For example, semantic models may be generated by identifying a set of relationships that are commonly used across the different unstructured text. In other words, a relationship is common across different unstructured text when a threshold number of phrases in the unstructured text use a tense of the verb embodying the relationship or a synonym of the verb. For each of the common relationships, the data types of the objects in the unstructured text matching the relationship are determined using machine learning algorithms. A single relationship may have multiple different data types associated with the relationship. Machine learning may be used to identify one or more sets of data types that are common (i.e., satisfy a threshold number or percentage) for the relationship. Each set may be a separate semantic model.

In some embodiments, the semantic models are generated using human interaction. In other words, one or more embodiments may have a modeler user interface, whereby a user maps sub-sentences of the sentence to model parameters of the semantic model. The modeler user interface may be a graphical user interface having graphical user interface widgets. For example, the graphical user interface may display the model parameters as selectable buttons. In the example, the user may highlight a sentence subpart of the sentence and the select the selectable button for the corresponding model parameter. The user may define the data type of the model parameter using one or more selectable buttons. By way of another example, the system may use machine learning to learn the data type for the model parameter over the span of several training sentences, such as by identifying commonalities between sentences matching similar semantic models.

In Step 205, the semantic models are stored in accordance with one or more embodiments of the technology. For example, the semantic models may be stored in a file, as records in a data base, or in any other manner. Storing the semantic models may include sending a request to the operating system of the computing system to reserve memory for the semantic models. The semantic modeling tool may then initiate a storage via the operating system to the reserved memory and/or storage device.

FIG. 3 shows a flowchart for using semantic models in accordance with one or more embodiments of the technology. In Step 301, the start of input of unstructured text is received in accordance with one or more embodiments of the technology. In other words, the user may access the authoring tool. From the authoring tool, the user may access the writing aid interface and open an existing document or a new document. If opening an existing document, the existing document is retrieved from memory. If starting a new document, memory for the new document is allocated via the operating system. The user, using any of a variety of input methods (e.g., typing on a physical or virtual keyboard, using a pointer instrument, using a microphone), starts submitting input in the form of unstructured text. In other words, the user submits input in a natural language that may be common for the domain.

In Step 303, while receiving the input, the input is compared to the semantic models in the semantic library in accordance with one or more embodiments of the technology. In one or more embodiments, the processing of the input is performed in real time. In other words, prior to a user completing submitting input, the system is providing suggestions for the user to complete the input. For each semantic model, a similarity score is calculated for the semantic model. In one or more embodiments of the technology, prior to calculating a similarity score, filtering may be performed to remove irrelevant semantic models. The similarity score may be calculated on only the remaining semantic models.

Comparing the input to the semantic models may be performed using cosine similarity and skipgrams. A skipgram may also be referred to as an N-skip-k-gram. In a skipgram, different phrases of length k consecutive words are created, while skipping a constant number N of words. By way of an example, for the sentence, “The patient did not eat since 3 PM today,” the following 1-skip-3-grams may be generated. “The patient did,” “The patient not,” “patient did not,” “patient did eat,” “did not eat,” “did not since,” “not eat since,” “not eat 3,” “eat since 3,” “eat since PM,” “since 3 PM,” “since 3 today,” and “3 PM today.” Comparing the input to the semantic models may be performed using cosine similarity and skipgrams. as follows. Each semantic model has an associated set of sentences that occurred in the past. In other words, each of the associated set of sentences are all mapped to the same semantic model. For each associated sentence, a set of skipgrams are computed for the sentence. In one or more embodiments of the technology, the set of skipgrams may be all possible skipgrams. Thus, semantic model sentence skipgrams includes skipgrams for a sentence that is associated with the semantic model. While the user is submitting an input sentence, the input sentence skipgrams, which are the skipgrams for the input sentence, are computed. The cosine similarity between the input sentence skipgrams and the semantic model sentence skipgrams is computed, for each sentence of each semantic model. The semantic model sentence having the highest cosine similarity from the input sentence is identified. The semantic model mapped to the semantic model sentence having the highest cosine similarity is identified and selected as the matching semantic model. In one or more embodiments, the similarity score may be the cosine similarity in embodiments in which skipgrams and cosine similarity is used.

Another method may be to take into account the number of skipped words and the number of matching words in the skipgrams when calculating the similarity score using the above technique. Further, in the above analysis, certain domains may benefit from the use of the skipgram. For example, in the healthcare domain, the skipgrams may assist in removing specific values, such as patient temperature.

In Step 305, a determination is made whether a semantic model exists that is within a threshold degree of similarity to the input in accordance with one or more embodiments of the technology. In particular, the similarity score of each semantic model is compared to the threshold. A determination is made whether the similarity score for at least one semantic model satisfies the threshold. Multiple similarity scores may satisfy the threshold, and the flow may proceed with each semantic model having a similarity score satisfying a threshold.

If a semantic model exists that is within a threshold degree of similarity to the input, then a suggestion is generated from the semantic model in Step 307 in accordance with one or more embodiments of the technology. In one or more embodiments of the technology, generating the suggestion may be performed by identifying parameter values based on a comparison of the data type of the parameters with the input. Input matching the data type and in the correct position of the sentence grammatically is identified as the parameter values. The parameter values are populated into the parameters. The semantic model may include additional parameter that have unknown values based on the input from the user being incomplete. Such parameter values may be left as blank. Alternatively, a prompt may be added to prompt the user to submit the corresponding parameter value. For example, the prompt may be the data type of the expected input.

As discussed above, multiple semantic models may have a similarity score satisfying the threshold. If multiple semantic models have a similarity score that satisfies the threshold, the suggestion may be generated for each semantic model using the above procedure. The suggestions may be ordered according to the similarity score in accordance with one or more embodiments of the technology.

In Step 309, the suggestion is presented to the user in accordance with one or more embodiments of the technology. In one or more embodiments of the technology, the one or more suggestions may be displayed in the graphical user interface. Displaying the suggestion may be performed by listing the suggestions in a selectable widget(s) or with selectable widgets. For example, a suggestions may be displayed as a label for a button, whereby when the user selects the button, the suggestion is accepted.

In Step 311, a determination is made whether the user accepts the suggestion in accordance with one or more embodiments of the technology. Different techniques may be used for a user to accept the suggestion. For example, the user may accept the suggestion using a pointer instrument or keyboard key and select the user interface widget corresponding to the suggestion. Alternatively, the user may continue submitting input indicating that the suggestion is not accepted.

If the user does not accept the suggestion in Step 311 or a semantic model does not exist that is within a threshold degree of similarity in Step 305, then a determination is made whether to generate a semantic model in Step 313 in accordance with one or more embodiments of the technology. In other words, one or more embodiments of the technology may learn new semantic models based on input from the user.

In Step 315, if a determination is made to generate a semantic model, then the semantic model is generated from the input in accordance with one or more embodiments of the technology. Generating the semantic model may be performed as discussed above with reference to FIG. 2.

Returning to Step 311, if the user accepts the suggestion, then the accepted suggestion is added to the input in Step 317. In other words, the input is augmented with the suggestion. Augmenting the input with the suggestion may include appending the input with the suggestion. In some embodiments, as part of the augmenting process, words in the input are replaced with synonyms for the words that are in the suggestion. Thus, one or more embodiments may change the input to conform to a standard. By modifying the input to conform to the standard, the content extraction may be easier and more accurate.

In Step 319, a determination is made whether more input is received in accordance with one or more embodiments of the technology. In one or more embodiments of the technology, the user may continue to submit input using the writing aid interface. If more input is being received, the flow may proceed to Step 303 to process the additional input in accordance with one or more embodiments of the technology. For example, the additional input may be new sentences complying with new semantic models or a continuation of a user submitting a same sentence.

Although not shown in FIG. 3, content extraction may be performed on the input. In other words, the augmented input may have a structure that allows the content extractor to identify the different parameters and operations for the input. Thus, the content extractor may extract the content and store the content in a data repository. By modifying how input is submitted and transforming the input, one or more embodiments may alleviate at least some of the difficulty in automated content extraction. Further, one or more embodiments may provide a more accurate extraction of content in accordance with one or more embodiments of the technology.

Figure 4:
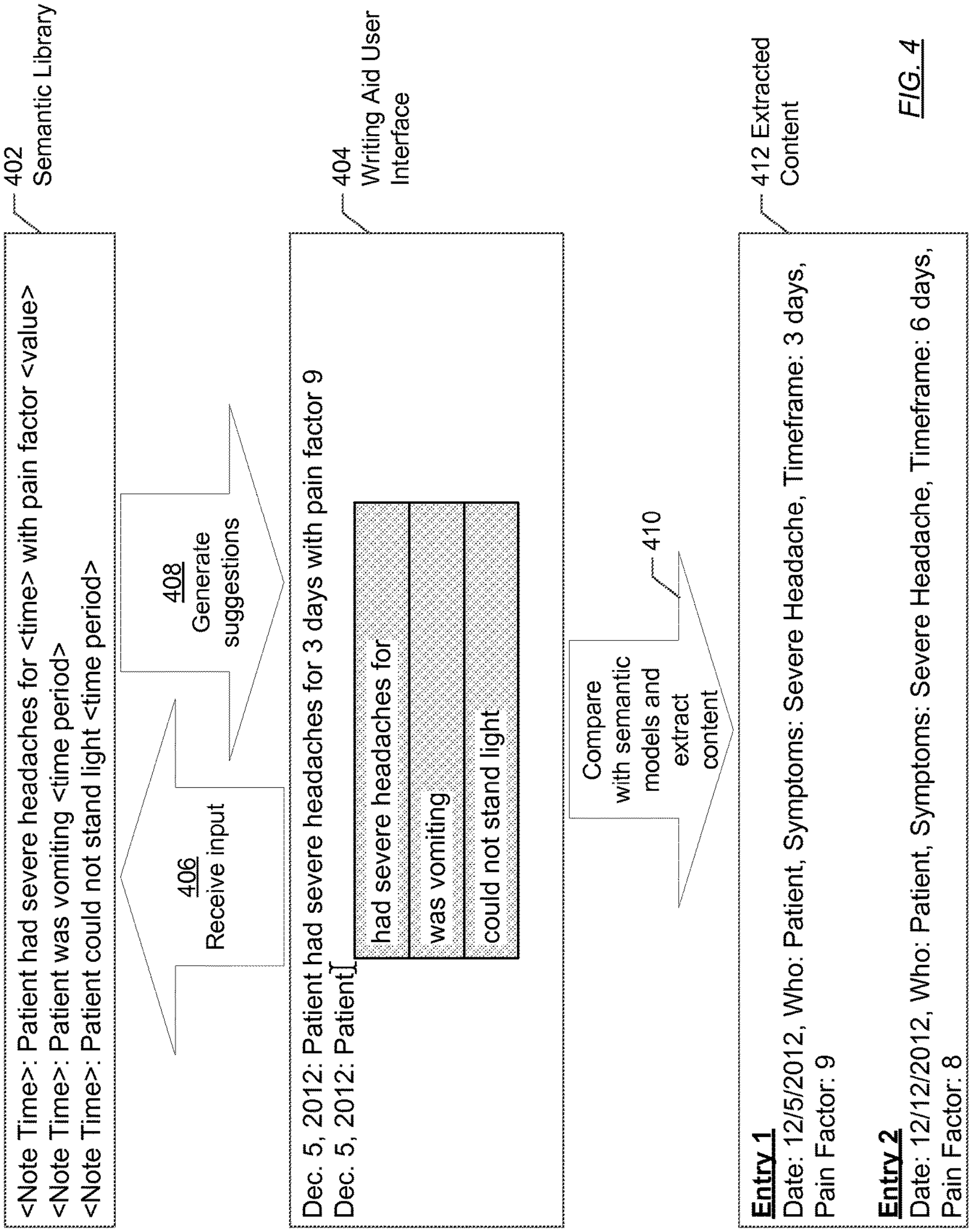
FIG. 4 shows an example in accordance with one or more embodiments of the technology.

FIG. 4 shows an example in accordance with one or more embodiments of the technology. The example in FIG. 4 is for explanatory purposes only and not intended to limit the scope of the technology. For FIG. 4, consider the scenario in which the domain specific semantic library is for doctor's notes. As shown in FIG. 4, the domain specific semantic library (402) includes the following semantic models: (1) <Note Time>: Patient had severe headaches for <time> with pain factor <value>; (2) <Note Time>: Patient was vomiting <time period>; (3) <Note Time>: Patient could not stand light <time period>. As shown in the example, each semantic model may specify a condition for the patient. The semantic model may also have parameters, such as "time period" of the patient's condition, "value" of a condition, and other parameters.

In the example, the user starts submitting input (e.g., "2012: Patient") via the writing aid user interface (404). The input is received and transmitted (406) to the text analyzer (not shown) that uses the semantic library (402). The text analyzer generates suggestions (408), which are displayed in the writing aid user interface (404). For example, the suggestions may include "had severe headaches for," "was vomiting," and "could not stand light." The user may select a suggestion and submit the parameter values for the suggestion. Thus, the user's input is augmented with the semantic model. Overtime, the user may submit input that directly comports with the semantic model. In such a scenario, although the semantic model may initially replace at least some of the user's input, the later semantic models may be used to complete the user's input.

In one or more embodiments of the technology, from the input, content may be extracted. As shown in FIG. 4, the input from the user may be compared with the semantic models to extract content (410). The content may include, for example, field value pairs for each item in the input. Thus, the extracted content (412) becomes structured content. As shown in FIG. 4, the sentence, "Dec. 5, 2012: Patient had severe headaches for 3 days with pain factor 9," may be extracted into an entry as: "Date: 12/5/2012, Who: Patient, Symptoms: Severe Headache, Timeframe: 3 days, Pain Factor: 9." Similarly, the sentence, "Dec. 12, 2012: Patient had severe headaches for 6 days with pain factor 8," may be extracted as "Date: 12/12/2012, Who: Patient, Symptoms: Severe Headache, Timeframe: 6 days, Pain Factor: 8." Because semantic models are used, the meaning of the sentences rather than just the grammar may be preserved. Further, one or more embodiments may assist in approximating structure in the unstructured text.

Figure 5:
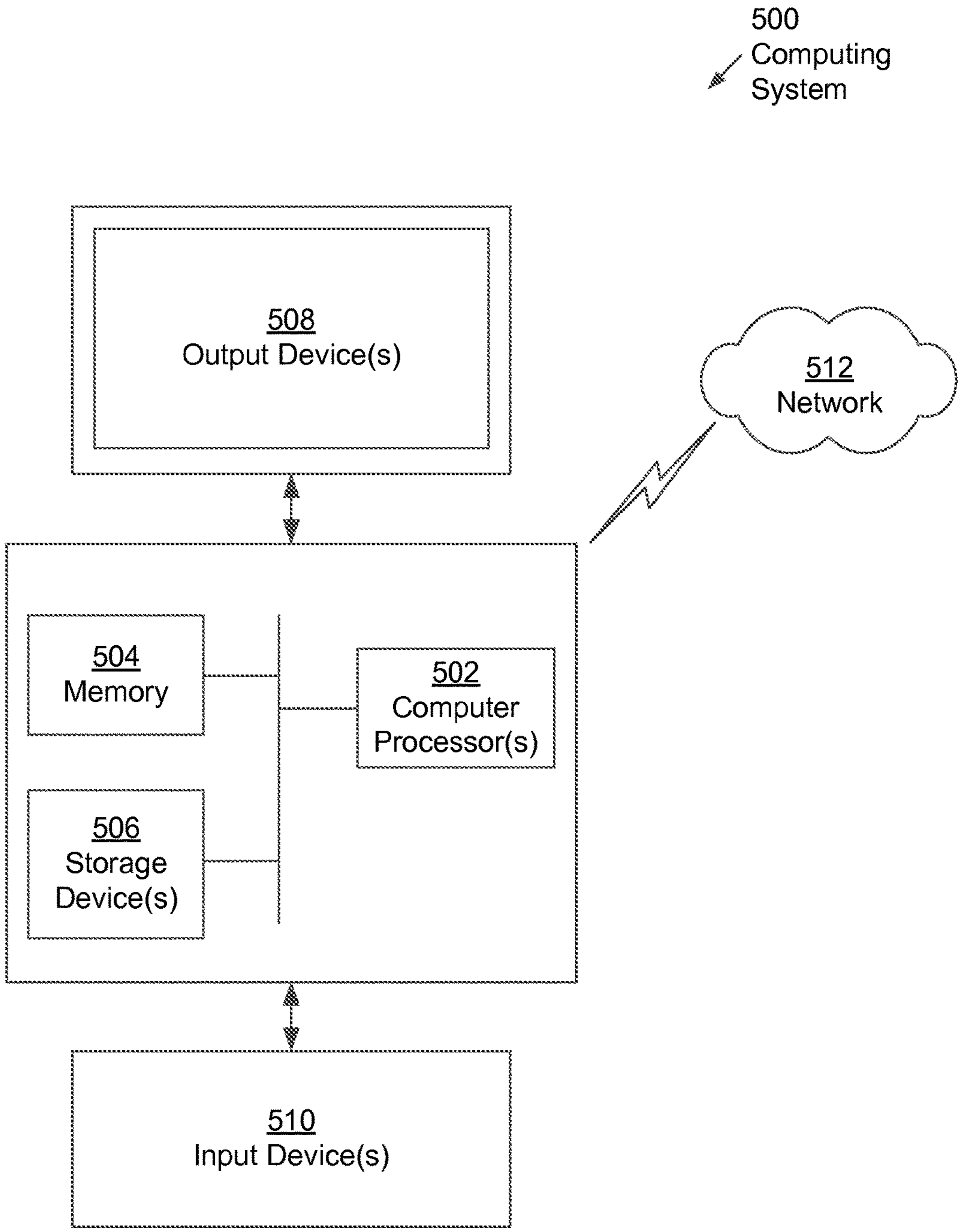
FIG. 5 shows a computing system in accordance with one or more embodiments of the technology.

Embodiments of the technology may be implemented on a computing system. Any combination of mobile, desktop, server, embedded, or other types of hardware may be used. For example, as shown in FIG. 5, the computing system (500) may include one or more computer processor(s) (502), associated memory (504) (e.g., random access memory (RAM), cache memory, flash memory, etc.), one or more storage device(s) (506) (e.g., a hard disk, an optical drive such as a compact disk (CD) drive or digital versatile disk (DVD) drive, a flash memory stick, etc.), and numerous other elements and functionalities. The computer processor(s) (502) may be an integrated circuit for processing instructions. For example, the computer processor(s) may be one or more cores, or micro-cores of a processor. The computing system (500) may also include one or more input device(s) (510), such as a touchscreen, keyboard, mouse, microphone, touchpad, electronic pen, or any other type of input device. Further, the computing system (500) may include one or more output device(s) (508), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (500) may be connected to a network (512) (e.g., a local area network (LAN), a wide area network (WAN) such as the Internet, mobile network, or any other type of network) via a network interface connection (not shown). The input and output device(s) may be locally or remotely (e.g., via the network (512)) connected to the computer processor(s) (502), memory (504), and storage device(s) (506). Many different types of computing systems exist, and the aforementioned input and output device(s) may take other forms.

Software instructions in the form of computer readable program code to perform embodiments of the technology may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the technology.

Further, one or more elements of the aforementioned computing system (500) may be located at a remote location and connected to the other elements over a network (512). Further, embodiments of the technology may be implemented on a distributed system having a plurality of nodes, where each portion of the technology may be located on a different node within the distributed system. In one embodiment of the technology, the node corresponds to a distinct computing device. Alternatively, the node may correspond to a computer processor with associated physical memory. The node may alternatively correspond to a computer processor or micro-core of a computer processor with shared memory and/or resources.

While the technology has been described with respect to a limited number of embodiments, those skilled in the art, having benefit of this disclosure, will appreciate that other embodiments can be devised which do not depart from the scope of the technology as disclosed herein. Accordingly, the scope of the technology should be limited only by the attached claims.

What is claimed is:

1. A method for semantic model usage, the method comprising:

receiving, via a graphical user interface on a computer system, input of unstructured text from a user;

while receiving the input:

providing the input to a plurality of semantic models in a semantic library, obtaining a plurality of similarities, wherein each of the plurality of similarities is calculated using the input and one of the plurality of semantic models, wherein a similarity of the plurality of similarities is a cosine similarity, selecting, using at least one of the plurality of similarities, a semantic model from the plurality of semantic models, wherein the semantic model is selected based on having the cosine similarity of the semantic model being less than a threshold, generating a suggestion from the semantic model, wherein the suggestion comprises at least a sub-sentence from the semantic model, wherein the semantic model comprises a plurality of sub-sentences, wherein at least one of the plurality of sub-sentences is associated with a parameter, and wherein the sub-sentence is one of the plurality of sub-sentences, presenting, in the graphical user interface, the suggestion to the user, receiving, from the user, an acceptance of the suggestion, and augmenting the input with the suggestion to create an augmented input; and storing the augmented input.

2. The method of claim 1, further comprising:

extracting content from the augmented input; and processing the extracted content.

3. The method of claim 1, wherein the augmented input is a revision of the unstructured text to match the suggestion.

4. The method of claim 1, wherein calculating the cosine similarity is performed using vectorized skipgrams.

5. The method of claim 1, further comprising:
processing a plurality of unstructured text documents to obtain the plurality of semantic models.

6. The method of claim 1, wherein the plurality of semantic models are specific to a professional domain.

7. A system for semantic model usage, the system comprising:
a computer processor;
a graphical user interface that:
receives, via the graphical user interface, input of unstructured text from a user, and
while receiving the input:
presents, in the graphical user interface, a suggestion to the user,
receives, from the user, an acceptance of the suggestion, and
a text analyzer that:
while receiving the input:
provides the input to a plurality of semantic models in a semantic library,
obtains a plurality of similarities, wherein each of the plurality of similarities is calculated using the input and one of the plurality of semantic models, wherein a similarity of the plurality of similarities is a cosine similarity,
selects, using at least one of the plurality of similarities, a semantic model from the plurality of semantic models, wherein the semantic model is selected based on having the cosine similarity of the semantic model being less than the threshold
generates the suggestion from the semantic model, wherein the suggestion comprises at least a sub-sentence from the semantic model, wherein the semantic model comprises a plurality of sub-sentences, wherein at least one of the plurality of sub-sentences is associated with a parameter, and wherein the sub-sentence is one of the plurality of sub-sentences,
augments the input with the suggestion to create augmented input; and
stores the augmented input.

8. The system of claim 7, further comprising:
a content extractor that:
extracts content from the augmented input; and
processes the extracted content.

9. The system of claim 7, wherein the augmented input is a revision of the unstructured text to match the suggestion.

10. The system of claim 7, wherein calculating the cosine similarity is performed using vectorized skipgrams.

11. The system of claim 7, further comprising:
a semantic modeling tool that:
processes a plurality of unstructured text documents to obtain the plurality of semantic models.

12. The system of claim 7, wherein the plurality of semantic models are specific to a professional domain.

13. A non-transitory computer readable medium for semantic model usage, the non-transitory computer readable medium comprising computer readable program code for:
receiving, via a graphical user interface, input of unstructured text from a user;
while receiving the input:
providing the input to a plurality of semantic models in a semantic library,
obtaining a plurality of similarities, wherein each of the plurality of similarities is calculated using the input and one of the plurality of semantic models, wherein a similarity of the plurality of similarities is a cosine similarity,
selecting, using at least one of the plurality of similarities, from the plurality of semantic models, a semantic model from the plurality of semantic models, wherein the semantic model is selected based on having the cosine similarity of the semantic model being less than the threshold,
generating a suggestion from the semantic model, wherein the suggestion comprises at least a sub-sentence from the semantic model, wherein the semantic model comprises a plurality of sub-sentences, wherein at least one of the plurality of sub-sentences is associated with a parameter, and wherein the sub-sentence is one of the plurality of sub-sentences,
presenting, in the graphical user interface, the suggestion to the user,
receiving, from the user, an acceptance of the suggestion, and
augmenting the input with the suggestion to create augmented input; and
storing the augmented input.

14. The non-transitory computer readable medium of claim 13, further comprising computer readable program code for:
extracting content from the augmented input; and
processing the extracted content.

15. The non-transitory computer readable medium of claim 13, wherein the augmented input is a revision of the unstructured text to match the suggestion.

16. The non-transitory computer readable medium of claim 13, wherein calculating the cosine similarity is performed using vectorized skipgrams.

17. The non-transitory computer readable medium of claim 13, wherein the plurality of semantic models are specific to a professional domain.

* * * * *